(12) United States Patent
Schulz et al.

(10) Patent No.: US 12,202,296 B2
(45) Date of Patent: Jan. 21, 2025

(54) WHEEL CARRIER APPARATUS FOR A MOTOR VEHICLE

(71) Applicant: Dr. Ing. h.c. F. Porsche Aktiengesellschaft, Stuttgart (DE)

(72) Inventors: Achim Schulz, Niefern-Oeschelbronn (DE); Phillip Aaron Grabowski, Stuttgart (DE); Maximilian Mahlberg, Cologne (DE); Andreas Higle, Wendlingen (DE); Daniel Winkler, Weissach (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 51 days.

(21) Appl. No.: 18/214,686

(22) Filed: Jun. 27, 2023

(65) Prior Publication Data
US 2024/0051337 A1 Feb. 15, 2024

(30) Foreign Application Priority Data

Aug. 9, 2022 (DE) ...................... 10 2022 120 016.7

(51) Int. Cl.
*B60B 27/00* (2006.01)
*F16C 19/18* (2006.01)
*F16C 25/06* (2006.01)

(52) U.S. Cl.
CPC ...... *B60B 27/0078* (2013.01); *B60B 27/0005* (2013.01); *B60B 27/0026* (2013.01);
(Continued)

(58) Field of Classification Search
CPC ............ B60B 27/0005; B60B 27/0026; B60B 27/0078; B60B 27/0084; F16C 19/186; F16C 19/187; F16C 25/06; F16C 2229/00
See application file for complete search history.

(56) References Cited

U.S. PATENT DOCUMENTS 4,466,503 A * 8/1984 Hans ................... B60B 27/0005
384/562
5,536,098 A * 7/1996 Schwarzler ......... B60B 27/0005
464/178
(Continued)

FOREIGN PATENT DOCUMENTS

DE       3620003 A1    12/1987
DE  102006033116 A1     1/2008
(Continued)

OTHER PUBLICATIONS

Great Britain Search Report for Application No. GB2311922.5, dated Nov. 6, 2023, 2 pages.

*Primary Examiner* — Phillip A Johnson
(74) *Attorney, Agent, or Firm* — Buchanan Ingersoll & Rooney PC

(57) ABSTRACT

Wheel carrier apparatus for a motor vehicle including a wheel hub to which a vehicle wheel can be fastened, and an articulation apparatus for torque transmission having an articulation housing and an articulation drive element operatively connected to the articulation housing. The articulation housing is arranged coaxially to the wheel hub and is connected to the wheel hub in a rotationally fixed manner. The wheel carrier apparatus further includes a wheel carrier on which the wheel hub and the articulation housing are borne via a wheel bearing in a rotationally fixed manner. The wheel bearing includes an outer bearing ring fastened to the wheel carrier, an inner bearing ring divided in the axial direction, and multiple rolling bodies arranged radially between the inner bearing ring and the outer bearing ring. The divided inner bearing ring includes a first inner bearing ring element and a second inner bearing ring element.

6 Claims, 1 Drawing Sheet

(52) U.S. Cl.
CPC ............ *F16C 19/186* (2013.01); *F16C 25/06* (2013.01); *F16C 2229/00* (2013.01)

(56) References Cited

U.S. PATENT DOCUMENTS

| | | |
|---|---|---|
| 2009/0206649 A1 | 8/2009 | Niebling et al. |
| 2022/0212495 A1 | 7/2022 | Albl et al. |

FOREIGN PATENT DOCUMENTS

| | | | | |
|---|---|---|---|---|
| DE | 102009051930 A1 | | 7/2010 | |
| DE | 102009034770 A1 | | 1/2011 | |
| DE | 102013220323 A1 | | 11/2014 | |
| DE | 102018121087 A1 | | 3/2020 | |
| DE | 102019128622 A1 | | 4/2021 | |
| DE | 102022120016 B3 | | 8/2023 | |
| FR | 2548595 A1 | | 1/1985 | |
| GB | 1392172 A | * | 4/1975 | ............ B60B 27/00 |
| JP | 4649713 B2 | * | 3/2011 | ............ B60B 27/00 |

\* cited by examiner

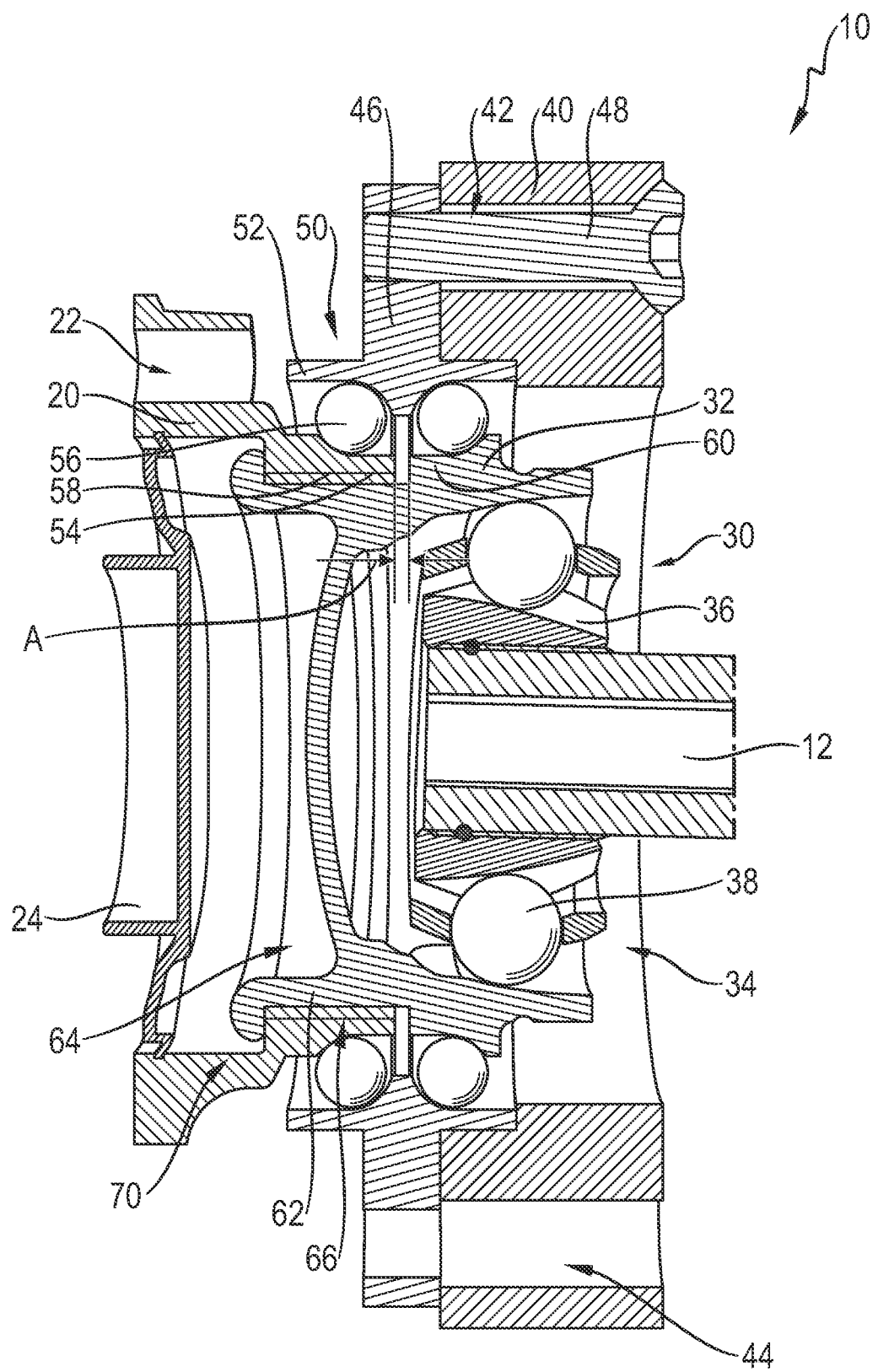

WHEEL CARRIER APPARATUS FOR A MOTOR VEHICLE

CROSS-REFERENCE TO RELATED APPLICATION

This application claims priority to German Patent Application No. 10 2022 120 016.7, filed Aug. 9, 2022, the content of such application being incorporated by reference herein in its entirety.

FIELD OF THE INVENTION

The invention relates to a wheel carrier apparatus for a motor vehicle, with a wheel hub to which a vehicle wheel can be fastened, an articulation apparatus for torque transmission comprising an articulation housing and an articulation drive element operatively connected to the articulation housing, wherein the articulation housing is arranged coaxially to the wheel hub and is connected to the wheel hub in a rotationally fixed manner, a wheel carrier on which the wheel hub and the housing are borne via a wheel bearing in a rotationally fixed manner, wherein the wheel bearing comprises an outer bearing ring fastened to the wheel carrier, an inner bearing ring divided in the axial direction, and multiple rolling bodies arranged radially between the inner bearing ring and the outer bearing ring.

BACKGROUND OF THE INVENTION

Such wheel carrier apparatuses are generally known. A wheel hub that receives a vehicle wheel is accommodated on a wheel carrier in a rotational manner by means of a single-row or double-row rolling bearing, i.e. wheel bearing. Depending on the configuration of the rolling bearing, the wheel hub can form the entirety or a part of an inner bearing ring, while the outer bearing ring is connected to the wheel carrier in a rotationally fixed manner. For example, double-row wheel bearings have a first bearing surface on the wheel hub and a second bearing surface on a further separate inner bearing ring, wherein the inner bearing ring is wound and rolled upon insertion of the rolling bodies of the first rolling row and the outer bearing ring onto the wheel hub. Such an embodiment of a wheel carrier apparatus is disclosed, for example, by DE 10 2013 220 323 A1, which is incorporated herein by reference.

To drive the wheel hub, the wheel hub is typically connected to a side shaft or a drive shaft in a torque-transmitting manner via an articulation apparatus for torque transmission. Such a configuration of the wheel carrier apparatus is disclosed, for example, in DE 10 2009 051 930 A1, which is incorporated herein by reference. A first inner bearing ring element is formed by the wheel hub and a second inner bearing ring element is fastened to the wheel hub. Alternatively, DE 36 20 003 A1, which is incorporated herein by reference also discloses a wheel carrier apparatus, wherein both inner bearing ring elements of the wheel bearing are configured separately and are pushed onto a portion of the wheel hub, wherein the biasing of the wheel bearing is adjusted by screwing an articulation housing to the wheel hub.

SUMMARY OF THE INVENTION

It is disadvantageous in the described embodiments of the wheel carrier apparatuses that the cost of manufacture and the cost of assembly are relatively high.

Described herein is a wheel carrier apparatus for a motor vehicle that can be manufactured and assembled in a simple and inexpensive manner. In addition, the weight of the wheel carrier apparatus is to be reduced.

Due to the fact that the divided inner bearing ring comprises a first inner bearing ring element and a second inner bearing ring element, wherein the first inner bearing ring element is manufactured integrally with the wheel hub and the second inner bearing ring element is manufactured integrally with the articulation housing, and wherein the articulation housing can be fastened axially to the wheel hub in such a way that the axial distance between the two inner bearing ring elements and the biasing of the wheel bearing is adjustable, the assembly and manufacturing effort can be reduced, wherein both inner bearing ring elements can be produced at the same time by an already existing manufacturing process, that is to say, the first inner bearing ring element by the manufacture of the wheel hub and the second inner bearing ring element by the manufacture of the articulation housing, and thus no additional separate manufacturing processes or assembly processes are required for the manufacture and assembly of the inner bearing ring element. In addition, the weight of the wheel carrier apparatus can be reduced by integrating multiple functions in fewer components.

Preferably, the articulation housing is inserted with a fastening portion into a through-opening of the wheel hub, wherein the articulation housing is connected in a form-fit manner to the wheel hub in the direction of rotation, and wherein a form-fit geometry creating the form-fit is configured on an outer circumferential surface of the fastening portion of the articulation housing projecting into the through-opening of the wheel hub and on an inner circumferential surface of the through-opening of the wheel hub. The articulation housing can thereby be reliably connected to the wheel hub, wherein the form-fit can be established over a relatively long axial portion. The form-fit connection is, for example, a fitted toothing, a polygonal connection, or a cycloidal connection.

In a preferred configuration, the fastening portion projects out of the through-opening of the wheel hub on the wheel hub side and comprises a rolling rivet collar in such a way that the articulation housing is axially fastened to the wheel hub via the rolling rivet collar. As a result, the articulation housing can be axially connected to the wheel hub in a simple manner without any additional connection components. During the assembly of the wheel carrier apparatus, the fastening portion of the articulation housing is inserted into the central through-opening of the wheel hub, and the free end projecting out of the through-opening on the wheel hub side is revolved outwardly. What is decisive here is that the articulation housing is axially positioned prior to the revolution, such that a predefined biasing of the wheel bearing is adjusted by the positioning of the articulation housing in relation to the wheel hub. The bearing tension is thus automatically adjusted by the fastening of the articulation housing.

In a preferred configuration, the outer bearing ring of the wheel bearing is bolted to the wheel carrier. Preferably, the outer bearing ring of the wheel bearing comprises a radial projection, which axially abuts the wheel carrier and is bolted to the wheel carrier. This allows the outer bearing ring to be easily fastened to the wheel carrier.

As a result, a wheel carrier apparatus is provided, which can be manufactured and assembled simply and inexpensively.

An embodiment example of the invention will now be explained in further detail with reference to the drawing.

BRIEF DESCRIPTION OF THE DRAWINGS

The sole FIGURE schematically shows a wheel carrier apparatus for a motor vehicle in cross-section.

DETAILED DESCRIPTION OF THE INVENTION

The FIGURE shows a wheel carrier apparatus 10, wherein each driven vehicle wheel of a motor vehicle is borne via such a wheel carrier apparatus 10. The wheel carrier apparatus 10 comprises a wheel hub 20, which comprises multiple circumferentially distributed through-openings 22 for fastening the vehicle wheel. The through-openings 22 in particular comprise an internal threading into which a screw inserted through an opening provided on a rim of a vehicle wheel can be screwed.

The wheel carrier apparatus 10 further comprises a wheel carrier 40 and an articulation apparatus 30 for torque transmission. For torque transfer, the articulation apparatus 30 comprises an articulation housing 32 and an articulation drive element 36 that is connected in a torque-transmitting manner via a transmission apparatus 34. The transmission apparatus 34 comprises multiple circumferentially distributed spheres 38 held by a cage and arranged in a respective groove of the articulation housing 32 and the articulation drive element 36. The articulated drive element 36 is connected to a drive shaft 12 in a rotationally fixed manner for driving the vehicle wheel. Furthermore, the articulation housing 32 is connected in a form-fit manner to the wheel hub 20 in the direction of rotation. The articulation housing 32 comprises a fastening portion 62, which engages with a through-opening 64 of the wheel hub 20, wherein, on an outer circumferential surface of the fastening portion 62 and on an inner circumferential surface of the through-opening 64, respectively complementary form-fit geometries of a form-fit 66, in particular an inner toothing and an outer toothing, are provided. The through-opening 64 is closed with a lid 24 on a side facing away from the articulation apparatus 30, which can also be releasably configured.

The articulation housing 32 as well as the wheel hub 20 are rotatably supported on the wheel support 40 via a wheel bearing 50, wherein the wheel bearing 50 is configured as a double-row ball bearing. The wheel bearing 50 comprises an outer bearing ring 52, an inner bearing ring 54, and multiple rolling bodies 56, in particular balls, arranged between the outer bearing ring 52 and the inner bearing ring 54.

The outer bearing ring 52 is fastened to the wheel carrier 40 via a radial projection 46 manufactured integrally with the outer bearing ring 52, wherein the outer bearing ring 52 radially abuts the wheel carrier 40 via an outer circumferential surface and axially abuts the wheel carrier 40 via the radial projection 46. To fasten the outer bearing ring 52 to the wheel carrier 40, the wheel carrier 40 comprises multiple circumferentially distributed through-holes 42 through which a respective bolt 48 is inserted. The bolt 48 abuts a side of the wheel carrier 40 facing away from the radial projection 46 and is screwed into a respective threaded bore 44 provided on the radial projection 46. In the lower region of the FIGURE, the through-hole 42 is shown without the bolt 48. On a circumferential surface facing away from the radial projection 46, the outer bearing ring 52 comprises two bearing surfaces for the two rows of the rolling bodies 56.

The inner bearing ring 54 is configured so as to be divided and has a first inner bearing ring element 58 and a second inner bearing ring element 60, wherein the two inner bearing ring elements 58, 60 are spaced apart from one another by a distance A. The first inner bearing ring element 58 is integrally manufactured with the wheel hub 20. In other words, the wheel hub 20 comprises a bearing portion on an outer circumferential surface, which forms a bearing surface of one of the two rows of the rolling bodies 56. The second inner bearing ring element 60 is manufactured integrally with the articulation housing 32, wherein an outer circumferential surface forms a bearing surface of the other row of rolling bodies 56.

The axial fastening between the wheel hub 20 and the articulation housing 32 is accomplished via a rolling rivet collar 70, wherein the rolling rivet collar 70 is formed on a portion of the fastening portion 62 projecting out of the through-opening 64. The projecting portion is bent radially outward and abuts axially against a surface of the wheel hub 20.

When assembling the wheel bearing 50, the two rows of the rolling bodies 56 are first mounted on the outer bearing ring 52, and then the wheel hub 20 and the articulation housing 32 are inserted and stuck into one another. Finally, the rolling rivet collar 70 is formed, wherein the biasing of the wheel bearing 50 is thus adjusted. For example, the wheel hub 20 is retained and the articulation housing 32 is axially displaced and stressed in a defined manner until a predefined distance A is present between the two inner bearing ring elements 58, 60. As soon as the predefined distance A required for the biasing is achieved, the portion of the fastening portion 62 projecting out of the through-opening 64 is outwardly deformed, thereby retaining the adjusted distance A.

Thus, a wheel carrier apparatus 10 is provided, which can be manufactured and assembled easily and inexpensively.

What is claimed is:

1. A wheel carrier apparatus for a motor vehicle, said wheel carrier apparatus comprising:
    a wheel hub to which a vehicle wheel can be fastened,
    an articulation apparatus for torque transmission comprising an articulation housing and an articulation drive element operatively connected to the articulation housing, wherein the articulation housing is arranged coaxially to the wheel hub and is connected to the wheel hub in a rotationally fixed manner, and
    a wheel carrier on which the wheel hub and the articulation housing are supported in a rotationally fixed manner via a wheel bearing,
    wherein the wheel bearing comprises an outer bearing ring fastened to the wheel carrier, an inner bearing ring divided in an axial direction, and multiple rolling bodies arranged radially between the inner bearing ring and the outer bearing ring,
    wherein the divided inner bearing ring comprises a first inner bearing ring element and a second inner bearing ring element, wherein the first inner bearing ring element is integrated with the wheel hub, and the second inner bearing ring element is integrated with the articulation housing, and
    wherein the articulation housing is configured to be axially fastened to the wheel hub in such a way that an axial distance (A) between the first and second inner bearing ring elements is adjustable.

2. The wheel carrier apparatus according to claim 1, wherein the articulation housing includes a fastening portion that is insertable into a through-opening of the wheel hub, wherein the articulation housing is connected in a form-fit manner to the wheel hub in a direction of rotation, wherein, in each case, a form-fit geometry creating the form-fit is disposed on an outer circumferential surface of the fastening portion of the articulation housing projecting into the through-opening of the wheel hub and on an inner circumferential surface of the through-opening of the wheel hub.

3. The wheel carrier apparatus according to claim 2, wherein the fastening portion projects out of the through-opening on a wheel hub side of the wheel hub and forms a rolling rivet collar in such a way that the articulation housing is axially fastened to the wheel hub via the rolling rivet collar.

4. The wheel carrier apparatus according to claim 1, wherein the outer bearing ring of the wheel bearing is releasably connected to the wheel carrier.

5. The wheel carrier apparatus according to claim 1, wherein the outer bearing ring of the wheel bearing comprises a radial projection, which axially abuts the wheel carrier and is releasably connected to the wheel carrier.

6. A motor vehicle comprising the wheel carrier apparatus of claim 1.

* * * * *